United States Patent
Haydon

[15] 3,685,278
[45] Aug. 22, 1972

[54] CLOCK SYSTEM
[72] Inventor: Arthur W. Haydon, Middlebury, Conn.
[73] Assignee: Tri-Tech, Inc., Waterbury, Conn.
[22] Filed: June 12, 1970
[21] Appl. No.: 45,609

Related U.S. Application Data
[63] Continuation-in-part of Ser. No. 866,322, Oct. 14, 1969.

[52] U.S. Cl. ................................ 58/24, 58/25
[51] Int. Cl. ........................................ G04c 13/04
[58] Field of Search .................. 58/24–26, 26 A, 58/27; 178/69.5; 340/248 B, 309.1; 343/7.5, 225; 318/75, 85

[56] References Cited

UNITED STATES PATENTS

| | | |
|---|---|---|
| 2,377,617 | 6/1945 | Dicke et al. ............ 58/26.5 X |
| 3,063,233 | 11/1962 | Bly ........................... 58/26 |
| 3,520,128 | 7/1970 | Novikov et al. ............ 58/24 |

Primary Examiner—Richard B. Wilkinson
Assistant Examiner—Edith C. Simmons
Attorney—Lee C. Robinson, Jr.

[57] ABSTRACT

A clock for use either with a source of alternating current of uniform frequency or a rechargeable power source. The clock is synchronized with the uniform frequency of the alternating current and has an internal, electro-mechanical timing standard. In some embodiments, timing pulses produced by the clock are distributed to slave clocks to activate stepper motors which advance each slave clock a predetermined discrete step. In other embodiments each slave clock includes a trigger circuit which momentarily connects a direct current power source across slave clock's stepper motor on receipt of a timing pulse, and low power rectified current is fed to this source between the pulses.

21 Claims, 6 Drawing Figures

CLOCK SYSTEM

CROSS-REFERENCE TO RELATED APPLICATION

This application is a continuation-in-part of co-pending application Ser. No. 866,322 filed Oct. 14, 1969 by Arthur W. Haydon.

BACKGROUND OF THE INVENTION

This invention relates to clocks and clock systems whose time keeping ability is dependent upon the frequency of an alternating current source.

While of general application, the present invention is particularly well suited for use in time keeping systems including a master unit and one or more secondary or "slave" units. The master unit, which may or may not incorporate visible time indicia, controls the operation of the various slave units in the system.

Heretofore, clocks of this type often have employed synchronous motors to translate the frequency of the current source into readable time. Such motors, however, must run continuously to keep up with the frequency and in so doing consume considerably more power than is needed for time keeping purposes. In addition, the synchronous speed of the motors normally is much higher than the speed of the clocks, and the motors thus require a large amount of gearing down to drive the clocks at the correct speed. The high speed of the motors increases wear and tear on both the motors and the gears with an attendant increase in maintenance cost. In clocks and clock systems using ordinary stepper motors there is also the problem of high power consumption and high maintenance cost.

There exist several additional disadvantages of many prior clocks and clock systems of this type when the supply of alternating current is interrupted, the most obvious being that the clocks must be reset when the line current is restored. Even in prior clocks and clock systems having an auxiliary source of power, the clock motors no longer are synchronized with an accurate source of timing intelligence. In those prior clocks using a spring as an auxiliary source of power, an additional disadvantage is that the endurance of the clock during the power failure is quite limited.

A still further disadvantage of many prior clock systems is that the timing pulses from the master clock to the slave clocks cause interference with the sophisticated electronic devices often used in businesses, such as computers or communication circuits, etc., necessitating costly shielding of the clock system.

SUMMARY OF THE INVENTION

The above and other disadvantages are overcome by one embodiment of the present invention which comprises a clock having an oscillating balance wheel carrying a magnet. The magnet generates a timing signal within a signal pickup coil which is amplified and fed back to a driver coil. The coil produces a magnetic force which tends to drive the oscillating member. When normally operating from the line current, however, the timing signal from the oscillating member is impressed with a signal which is synchronous with the uniform frequency of the line power supply so that the oscillations of the balance wheel are a synchronized submultiple of the frequency of the alternating current source.

This clock may be used as the master timing device in a clock system. The clock is effective to generate pulses at timed intervals which are distributed to a series of slave clocks powered by stepper motors. The stepper motors advance in discrete steps upon receipt of the timing pulses from the master clock.

The master and slave clocks normally are powered by the line current or by a centralized standby DC supply, but in some embodiments each individual clock has its own auxiliary, rechargeable, direct current power source so that each clock will continue to operate whether line current is interrupted to it or to the whole clock system.

The timing pulses from the master timing device to the slave clocks are produced by the rotation of the magnet past the signal pickup coil. The amplified signal from the coil is distributed to the slave clocks. The pulse thus produced has slow rise and fall times, relative to conventional pulse generators such as cam operated switches or multivibrators, so as not to produce transients of a type which would cause interference with neighboring electronic equipment.

Little power is consumed by the slave clocks because they are operated by stepper motors which are only intermittently pulsed. Some preferred embodiments include stepper motors of the type disclosed in U.S. Pat. No. 3,495,107 issued to Arthur W. Haydon on Feb. 10, 1970. This type of stepper motor has low power consumption and needs little maintenance as compared with conventional stepper motors which use mechanical switches in the stator field circuit and mechanical no-back devices to prevent the rotor of the motor from starting in the reverse or backward direction. The stepper motor of the patent also eliminates the need for expensive reduction gear trains as are required of the 3,600 r.p.m. synchronous motors used in many prior systems.

It is highly advantageous that the clocks of these embodiments normally be synchronized with the 60-cycles per second (hereinafter "c.p.s.") alternating line current power available from local utility companies. Virtually all the major utility companies in the United States are members of a nationwide power network whose frequency is maintained at 60 c.p.s. with a tolerance of ± 0.2 c.p.s. on an instantaneous basis and a maximum accumulated error of ± 0.25 cycles in 24 hours. This network customarily holds any accumulated drift of the network frequency within these fixed limits by comparing the frequency with time signals from the Bureau of Standards in Washington, D. C. Thus the clocks and clock systems of the invention are synchronized with a highly accurate source of timing intelligence.

Another timing apparatus which may advantageously be used to form the master timing device in a clock system according to the invention is disclosed in U.S. Pat. application Ser. No. 837,774, filed June 30, 1969 by Arthur W. Haydon.

The term "clock," as used herein, means any sort of time indicating, controlling or recording mechanism such as a clock with a dial and hand, a digital clock, a time switch, a repeat cycle timer, an elapsed time indicator, a chart drive, or other instruments where the essential function of the mechanism is dependent on timing intelligence.

The present invention, as well as further objects and features thereof, will become more fully apparent from the following detailed description of certain preferred embodiments, when read with reference to the accompanying drawings.

DESCRIPTION OF THE PREFERRED EMBODIMENTS

Figures 1, 3, 4:
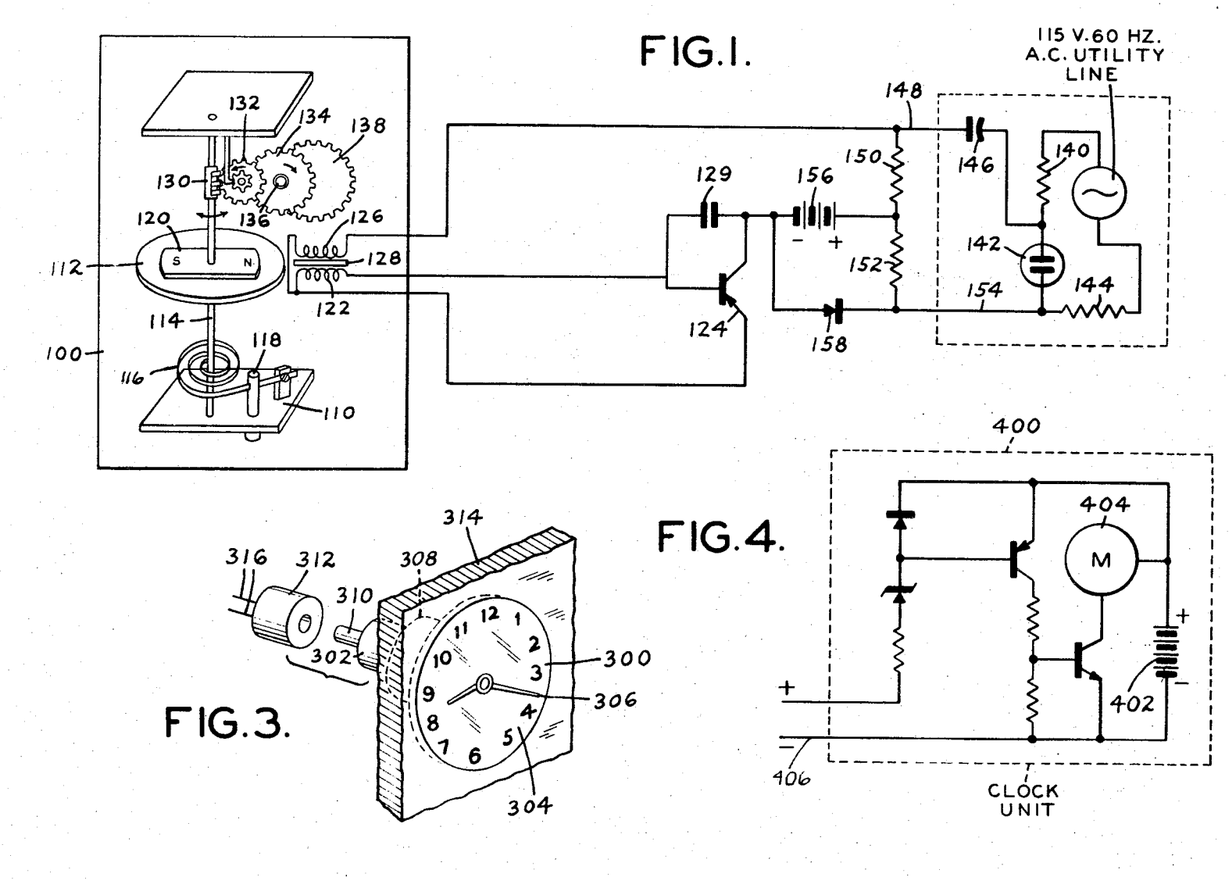
FIG. 1 is a schematic diagram of a clock according to one preferred embodiment of the invention.
FIG. 3 is a perspective view of a slave clock shown partially broken away.
FIG. 4 is a schematic diagram of an electrical circuit in the individual slave clock of a preferred embodiment of the invention.

Referring to FIG. 1, an embodiment of the invention comprises a clock 100 which includes a support 110 for a balance wheel 112 mounted on a shaft 114 for oscillatory motion about its axis in opposite directions from a midposition. A hair spring 116 is affixed between the shaft 114 and the support 110. Together, the hair spring and balance wheel form an oscillating unit having a predetermined natural periodic frequency which is calculated to be a submultiple of the utility line current frequency. The beat rate of the balance wheel system may be adjusted by a hair spring adjustment 118 mounted on the support 110.

A permanent magnet 120 is mounted on the balance wheel 112 such that the magnetic field extending from at least one of its poles sweeps through an arc with each oscillation of the balance wheel. The arcuate sweep of this magnetic field generates a signal in a pickup coil 122 mounted adjacent the balance wheel 112. The signal in the pickup coil 122 is amplified by a transistor circuit 124, which functions as a feedback amplifier, and the signal is fed back to a driver coil 126 which is adjacent the balance wheel 112. The amplified pulse to the drive coil 126 generates a periodic magnetic force which acts on the oscillating balance wheel 112 to sustain its natural frequency. A decoupling short circuit winding or disc 128 between the coils and a capacitor 129 connected between the collector and the base of the transistor circuit 124 act to decouple the signal pickup coil 122 from the driver coil 126 so that the drive signals are not fed back to the amplifier circuit 124.

An interrupted worm gear 130 mounted on the clock shaft 114 engages a ratchet wheel 132 to translate the oscillatory motion of the balance wheel 112 into the unidirectional rotation of another reduction gear 134. The reduction gear 134 is mounted on a horizontal shaft 136 which turns the second hand (not shown) on the clock 100. The reduction gear 134 engages further reduction gears 138 which turn the minute and hour hands (not shown) of the clock 100.

The clock 100 is powered by a voltage divider and rectifier network which recharges a battery. A resistor 140, a neon bulb 142, and a resistor 144 are connected in series across the alternating current utility line input. Connected in parallel with the neon bulb 142 is a capacitor 146 in series through a lead 148 with a resistor 150 which is in series with another resistor 152. The resistor 152 is connected through a lead 154 back to the other side of the neon bulb 142.

The resistors 140, 144, the neon bulb 142 and the capacitor 146 are mounted in a male plug 120 comprise a relaxation oscillator which delivers 120pulses per second of alternating polarity to the clock 100.

Connected in parallel with the resistor 152 is a rechargeable battery 156 in series with a diode 158 of a polarity such that the battery 156 is recharged.

The collector-emitter circuit of the transistorized amplifier 124 comprises, in series, the battery 156 connected between the transistor collector and the common leads of the resistors 150 and 152. The other lead of the resistor 150 is connected to one lead of the driver coil 126. The other lead of the driver coil 126 is connected to the emitter of the transistor. The effect of having the resistor 150 in this series connection is to induce an AC ripple in the circuit to the driver coil 126 which supplements the oscillatory pulses from the transistor circuit 124 so as to synchronize the oscillations of the balance wheel with a submultiple or harmonic of the frequency of the utility line.

The neon bulb 142 and the capacitor 146 function to shorten and intensify the AC ripple, and the neon bulb also serves as an indicator that the AC supply is on.

The system functions satisfactory without the neon bulb 142 and the capacitor 146 merely by connecting the resistor 150 directly to the resistor 140 through the lead 148 and by leaving the resistor 152 connected to the resistor 144 through the lead 154. The resistors 144 and 140 serve to reduce the total energy obtainable from the plug connections to a value below the maximum set by the Underwriters Laboratories, so that a smaller line cord and less costly clock insulation may be employed.

The energy level of the AC supply also may be maintained below the Underwriters Laboratories maximum by employing a suitable step-down transformer (not shown) in the line cord plug. In these latter embodiments the resistors 140 and 144 may be eliminated from the circuit. Such a transformer is particularly advantageous when an entire clock system is to be driven by the battery 156 of FIG. 1A or the battery 218 of FIG. 2, instead of using auxiliary power supplies for each secondary clock. The clock systems of FIGS. 1A and 2 will be described in more detail hereinafter.

While the clock 100 of FIG. 1 is described as having a pickup coil, a feedback amplifier and a driver coil, in other embodiments the synchronized clock comprises a balance wheel powered by a conventional spring-escapement mechanism. The spring is wound by an electric motor periodically activated by the escapement mechanism. The clock of these embodiments is synchronized with the alternating current source by a low voltage AC signal derived from the source which is fed to a driver coil mounted adjacent the balance wheel. A permanent magnet carried by the balance wheel responds to the fluctuating magnetic force produced in the driver coil to make the balance wheel oscillate at a submultiple of the alternating current source frequency and in synchronism with it.

In both of the above embodiments a permanent magnet is mounted on a periodic motion device such as the balance wheel 112. In other embodiments however, the balance wheel is itself a bipole permanent magnet. In still other embodiments, an electric coil magnet is mounted on the balance wheel, or the balance wheel is replaced by a conventional tuning fork (not shown).

Figure 1A:
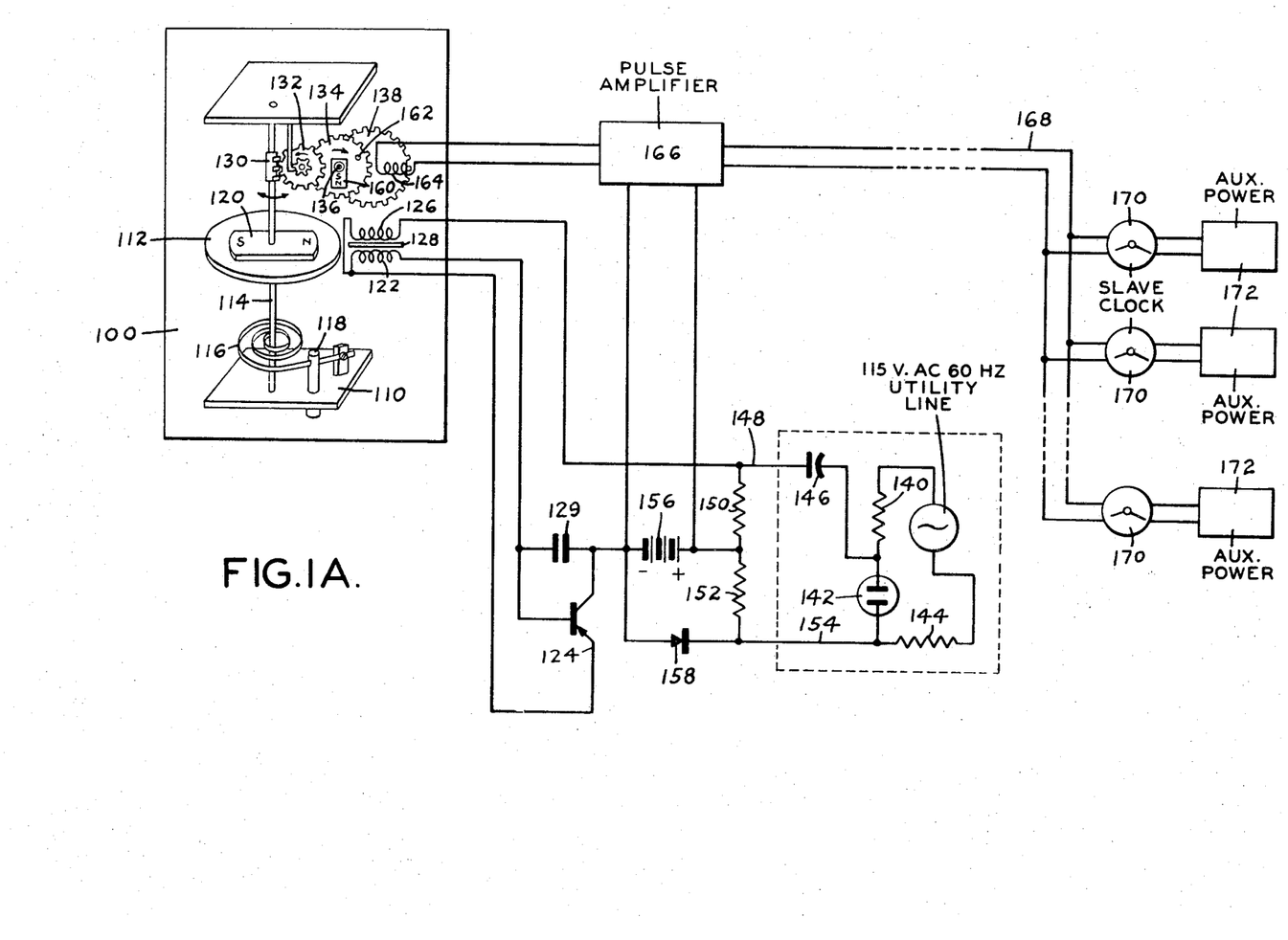
FIG. 1A is a schematic block diagram of the clock of FIG. 1 in a clock system.

While the clock 100 may be operated by a high accurate individual time piece as in the embodiment of FIG. 1, in the embodiment of FIG. 1A it is the master timing device of a clock system. The clock 100 is equipped to generate a a series of clock pulses to simultaneously advance the various slave clocks in the system. A permanent magnet 160 is mounted by a bushing on the horizontal gear shaft 136 so that it may freely rotate about the shaft. A pin 162 projecting from the flat portion of the gear 134 periodically moves the magnet 160 from its equilibrium position slightly more than 180° into a vertically upright and unstable position. As the gear continues to turn, the magnet 160 quickly rotates due to the force of gravity past a signal coil 164 to again reach its equilibrium position.

In swinging past the signal pickup coil 164, the magnet 160 generates a pulse in the coil which is fed to an amplifier 166. The amplified pulse is passed through a control network 168 to a plurality of slave clocks 170. Since the reduction gear 134 makes 1 revolution per minute, the timing pulses to the slave clocks are correspondingly spaced at 1 minute intervals. The timing pulses thus produced have slow rise and fall times compared with pulses produced by the closing of a contact switch as is done in some prior clock systems, and produce no harmful transients to cause electronic interference. The amplifier 166 is powered by the battery 156.

The slave clocks 170 each have their own auxiliary source of power 172 which includes a rechargeable battery and a rectifying and recharging circuit connected to the utility line system. In other embodiments the battery is recharged over the pulsing network 168 as will be explained further in reference to the embodiments of FIGS. 3 and 4. In still further embodiments, as for example the embodiment of FIG. 3, the slave clocks are driven directly by the pulses received from the pulse amplifier 166, and therefore no source of auxiliary power is necessary.

In some embodiments the magnet 160 and the pickup coil 164 may be eliminated, and the input to the pulse amplifier 166 may be connected in parallel with the driver coil 126. With this arrangement the pulses from the transistor circuit 124 are supplied directly to the amplifier 166 to drive the secondary clocks 170.

Figure 2:
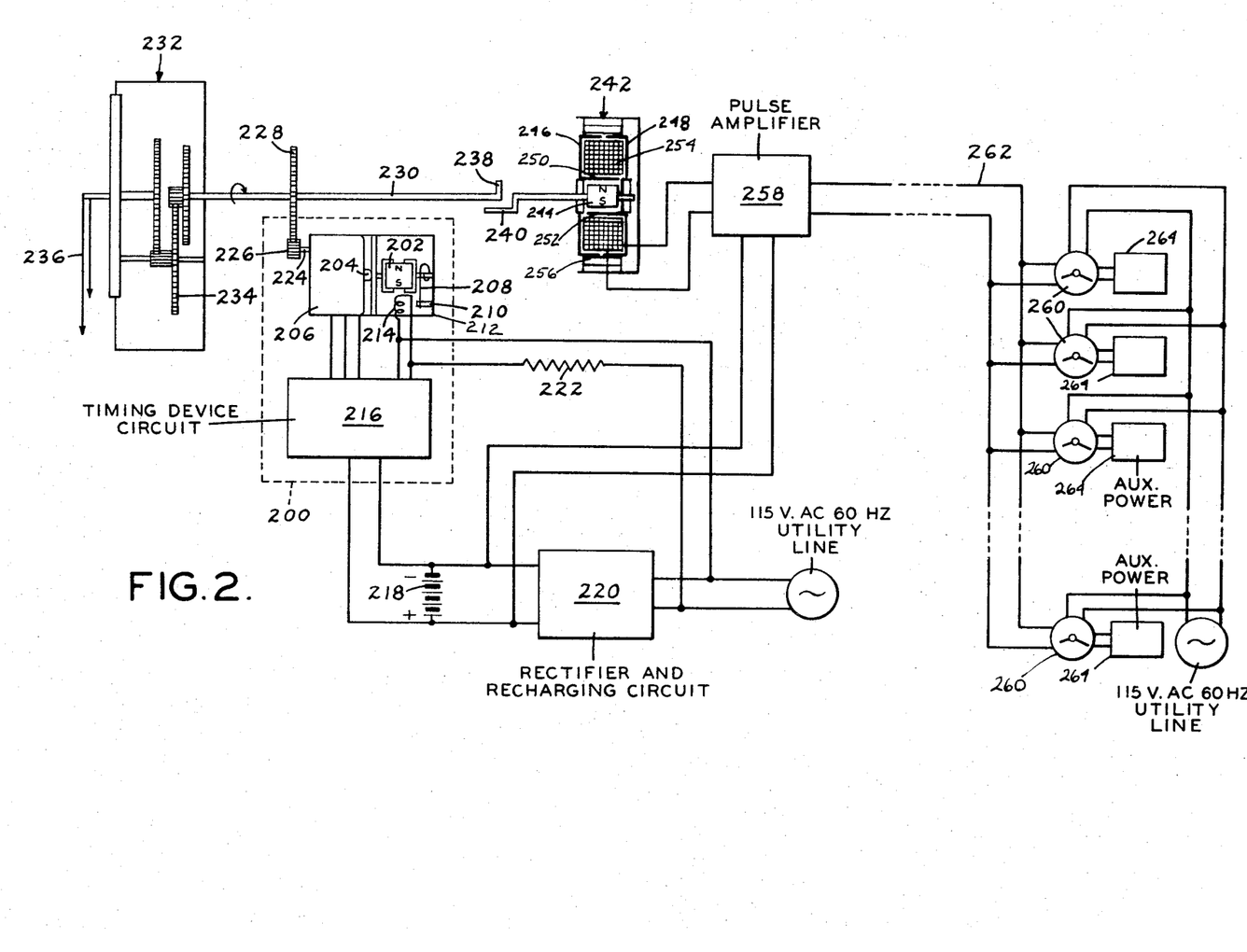
FIG. 2 is a schematic block diagram of a clock system according to another preferred embodiment of the invention.

Referring now to FIG. 2, another preferred embodiment includes a timing apparatus 200 of the type disclosed in U.S. application Ser. No. 837,774, filed June 30, 1969 by Arthur W. Haydon. Such a device comprises a balance wheel 202 which is permanently magnetized and mounted about an axis adjacent the axis of a permanently magnetized rotor 204 of a three-wire stepper motor 206. The balance wheel 202 is restrained from making a full rotation about its axis by a hair spring 208 fixed between the shaft of the balance wheel 202 and an anchor post 210 on the frame 212 supporting the balance wheel. The usual regulator (not shown) is employed to adjust the effective length of the spring 208 in accordance with the desired beat rate. The balance wheel is loosely magnetically coupled to the rotor 204 so as to oscillate at a predetermined natural frequency which is calculated to be a submultiple or a harmonic of the utility line frequency, in response to the rotation of the rotor. The device also includes a signal coil 214 adjacent the balance wheel, for generating an electrical signal representative of the frequency of its oscillations. This signal is fed to an electronic circuit 216 which amplifies the signals and uses it to pulse the three-wire stepper motor 206 and thus control the speed of rotation of the rotor 204. The electronic circuit 216 and the motor 206 are powered by a battery 218. A rectifier and recharging circuit 220 converts the alternating current from the utility line into direct current and recharges the battery 218 during periods of normal operation.

The signal pickup coil 214 is coupled to the utility line alternating current through a high resistance 222. The purpose of this coupling is to impress a small voltage of alternating current, synchronized with the frequency of the utility line, upon the signal generated by the balance wheel 202 in the signal pickup coil 214. This synchronizes the operation of the timing device 200 with the uniform frequency of the utility line.

The drive shaft 224 of the stepper motor 206 has a pinion gear 226 mounted on it which engages a reduction gear 228. The gear 228 is mounted on a clock shaft 230. The clock shaft 230 is rotatably mounted in a clock housing structure 232 and through a series of reduction gears 234 it turns the hands 236 of the clock. At one end of the clock shaft is a right angle leg 238. This leg 238 engages a bell crank 240 extending from a pulse generator 242. The structure of the pulse generator 242 may be similar to the disclosure of Haydon U.S. Pat. No. 3,495,107 referred to above, although there is no need to employ the shading structure of the patent.

A permanent bipole rotor 244 is mounted on the bell crank shaft 240. The rotor 244 is enclosed by a pair of centrally orificed cup-shaped stator pole pieces 246 and 248. Each pole piece includes a salient pole 250 and 252, respectively, projecting along an axis parallel to the axis of rotation of, and spaced apart from, the rotor 244. A field coil 254 mounted co-axially with the rotor 244 is also encased by the cup-shaped pole pieces 246 and 248. A permanent magnet strip 256 is wrapped around the outer periphery of the cup-shaped pole pieces 246 and 248. The poles of the magnetic strip 256 are magnetically linked to the adjacent salient stator pole pieces 246 and 248 and generate a biasing flux which passes through the rotor 244. The effect of this bias flux is to cause the rotor 244 to align its magnetic poles with the stator poles 250 and 252 of opposite magnetic polarity.

When the rotation of the clock shaft 230 causes the leg 238 to rotate the bell crank 240 slightly more than 180° from the rotor's equilibrium position, the rotor will attempt to quickly rotate the remaining portion of a complete revolution to return to its equilibrium position. This latter movement will generate a pulse in the field coil 254 which has a relatively slow rise and fall time compared with the closing of a contact switch, as is done in some prior clock systems, and produces no harmful transients to cause electronic interference. This pulse is transmitted to a pulse amplifier 258 where it is amplified and distributed to the slave clocks 260 over a timing pulse distribution network 262. The pulse amplifier 258 is powered by the battery 218.

In the embodiment of FIG. 2, the balance wheel 202 continues its oscillations whether the utility line is supplying power to the system or not. In other embodiments, the balance wheel 202 is prevented from oscillating by a solenoid which holds it rigidly during normal operation. The synchronizing signal through the resistance 222 ensures that the motor 206 rotates synchronously or at a submultiple of the utility line frequency. With an interruption of power, the solenoid releases the oscillating member 202 so that the timing device 200 will operate independently of the power line system.

In still other embodiments the clock housing 232, gears 234, and hands 236 are omitted.

The slave clocks 170 and 260 of the embodiments of FIGS. 1A and 2, are essentially of the same construction. For convenience of description only, a particular slave clock embodiment will be described in detail with new reference numbers in FIG. 3, but it is to be understood that this embodiment may be substituted for the slave clocks 170 or 260. As best shown in FIG. 3, each slave clock 300 includes a stepper motor 302, a clock face 304 and clock hands 306. Reduction gearing 308 interconnects the motor shaft with the clock hands 306. The motor 302 illustratively comprises a two-wire stepper motor of the type disclosed in U.S. Pat. No. 3,495,107 issued to Arthur W. Haydon on Feb. 10, 1970.

The gear ratio between the stepper motor 302 and the minute hand is so low that the hand can be manually set without a friction device between the motor and the hand. The stepper motor is provided with a permanent magnet rotor which acts as a detent to position the hands at each minute on the clock dial, until the next pulse advances the rotor. This provides not only an inexpensive clock movement but an extremely reliable one because of its simplicity.

The rotor of the stepper motor 302 is housed in a closed ended, cylindrical projection 310 of the motor casing. The motor 302, the reduction gears 308, and the stator structure and field coil 312 are mounted in an inset in the wall 314. The clock face 304 is mounted on the wall 314. The motor 302 and the reduction gearing 308 are simply plugged through a hole in the wall 314 into the stator structure 312. This is highly advantageous in that the only moving parts of the slave clock 300 are easily accessible for purposes of repair and maintenance. In other embodiments, the whole slave clock movement is plugged into the clock pulse control network inset in the wall through a hole in the clock dial mounted on the wall.

The field coil of the motor 302 is connected to the control pulse network from the master clock by the leads 316. As discussed above in reference to the embodiments of FIGS. 1A and 2, the master timing device sends pulses through a pulse amplifier which activate the stepper motor 302 to advance the hands 306 of the clock in discrete steps.

In some systems it may be desirable to advance all the clocks together simultaneously without transmitting a large pulse of energy from the master timing device. As the number of slave clocks in the system is increased so is the energy needed to pulse the clocks. A slave clock embodiment which greatly reduces the amount of energy required for the timing pulse is shown in FIG. 4 as comprising a trigger circuit 400, a direct current power source 402, and a stepper motor 404 of the type discussed above in connection with FIG. 3. The power source 402 comprises a rechargeable battery.

During the time between pulses, when the slave clocks are quiescent, the master timing device sends out a constant low level DC signal over the pulse network 406 to supply power to each of the trigger circuits 400 and thus charge the batteries 402.

The trigger circuit 400 includes a plurality of transistors, resistors and diodes connected in circuit with each other to momentarily connect the battery 402 across the motor 404 whenever a pulse is received from the master timing device over the pulsing network 406. With this construction, the function of the trigger circuit is to connect and disconnect the battery to the motor and to charge the battery in the interval between the signals from the master timing device. Thus, only a small amount of power is required from the master timing device in order to pulse the slave clocks simultaneously.

If desired, a capacitor (not shown) may be substituted for the battery 402, in which event the low level rectified current charges the capacitor and the capacitor in turn is allowed to discharge across the motor 404. One advantage of using a battery in place of a capacitor, however, is that a battery powered alarm device (not shown) may be added to each slave clock. Such a device may be set and triggered locally at the slave clock completely independently of the master unit.

Figure 5:
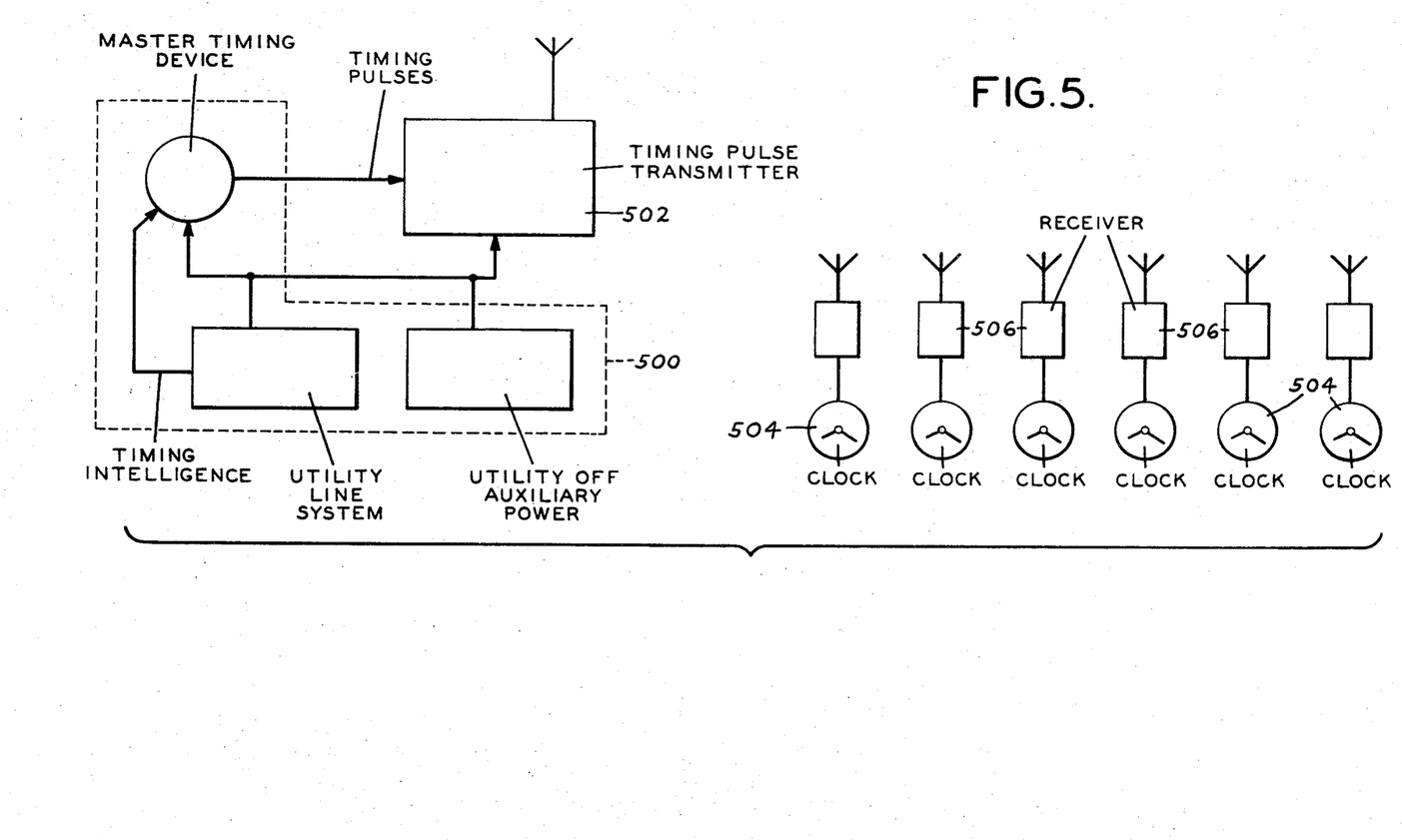
FIG. 5 is a schematic block diagram of a clock system according to a still further preferred embodiment of the invention.

Referring now more particularly to FIG. 5, there is shown a master unit 500 which generates timing pulses as described heretofore, which inputs to a radio transmitter 502 for conveying the pulses to a series of slave clocks 504 by a low level radio signal rather than by direct wiring. The signal is simultaneously received by a radio receiver 506 in each clock which actuates a trigger circuit (not shown in FIG. 5) within the clock to advance it a predetermined step. Thus all the clocks advance simultaneously. With exception of the radio receiving device 506, the clocks 504 are generally similar to those of the clock embodiments of FIGS. 4 and 5 and include a trigger circuit, a battery and a stepper motor for advancing the clocks one step in response to the receipt of each pulse.

In still other embodiments the secondary clocks 504 of FIG. 5 may be similar to the clock 100 of FIG. 1, the radio pulses transmitted from the master clock serving to synchronize the balance wheel in each secondary clock. In systems of this type the secondary clocks are responsive only to pulse trains which have the same periodicity as the secondary clocks' balance wheels or a harmonic or submultiple thereof. Such an arrangement is particularly advantageous in cases in which the system is subject to spurious pulses, transients, or static discharges which might otherwise adversely affect the accuracy of the secondary clocks.

Although in the embodiments described above, the slave clocks are located remotely from the master unit, in other embodiments the master unit and one or more clocks are all packaged together in a single housing. In addition, though the transmission of timing intelligence of the master unit to the secondary clocks has been described heretofore in some embodiments as involving direct current pulses, other methods of transmitting such information may be used, for example, reversing the polarity of a circuit, interrupting the circuit to the slave clocks or delivering a high frequency signal to each clock.

Another advantage of a clock system according to the invention, is that by inserting appropriate circuitry in the master timing unit, the time indication of the secondary clocks may be simultaneously adjusted. Thus, if the clocks are slow, an appropriate number of additional pulses may be transmitted to the slave clocks to correct the situation. In some embodiments this additional circuitry is no more than an additional pulse generator 242 adapted to be operated manually. Similarly, if the clocks are fast because of the changeover from daylight savings time to standard time, for example, the delivery of timing pulses may be interrupted by opening a switch in the pulse distribution network for a period of time sufficient to bring the clocks back into a condition in which they indicate the proper time.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. In a clock system responsive to an alternating current source of predetermined frequency, in combination, periodic motion means having a predetermined natural periodic timing frequency, magnetic means mounted on the periodic motion means, means for sustaining the movement of the periodic motion means, means responsive to the alternating current signal for generating an electromagnetic field which exerts a periodic force on the magnetic means to synchronize the movement of the periodic motion means with a frequency which is a function of that of the alternating current source, and an auxiliary source of direct current to power the periodic motion means during interruptions of the signal from the alternating current source, the auxiliary source including a rechargeable battery and means responsive to the signal from the alternating current source for charging the battery.

2. A clock for use with a source having an alternating current signal of predetermined uniform frequency, comprising a balance unit mounted for periodic motion and having a predetermined natural periodic timing frequency, magnetic means mounted on the balance unit for producing a unidirectional magnetic field, means for sustaining the periodic motion of the balance unit, means responsive to the alternating current signal for generating an electromagnetic field which exerts a periodic force on the magnetic means to synchronize the periodic motion of the balance unit with the frequency of the alternating current source, and an auxiliary source of direct current to power the clock during interruptions of the signal from the alternating current source, the auxiliary source including a rechargeable battery and means for charging the battery from the alternating current source.

3. A clock as recited in claim 2, wherein the means for sustaining the periodic motion of the balance unit includes a pickup coil adjacent the balance unit for generating an oscillatory signal in response to the magnetic means, an amplifier responsive to the oscillatory signal, and a driver coil, the driver coil being connected to the output of the amplifier and positioned adjacent the balance unit, such that the amplified oscillatory signal generated in the driver coil exerts a periodic magnetic force upon the magnetic means mounted on the balance unit so as to sustain the oscillations of the balance unit.

4. A clock as recited in claim 2 wherein the means for charging the battery comprises a relaxation oscillator which generates pulses synchronized with each half wave of the alternating current source signal and means for converting at least half of the pulses into a direct current.

5. A clock system for use with a source having an alternating current signal of predetermined uniform frequency, the system comprising a master timing device responsive to the frequency of the alternating current signal for producing clock pulses at timed intervals, means for supplying timing intelligence to the master timing device during periods of interruption of the alternating current signal to the master timing device, a plurality of clock units each including a stepper motor which advances its clock a predetermined discrete step in response to each clock pulse delivered to it, and means for distributing clock pulses from the master timing device to the stepper motors to advance the clocks in accordance with the timing pulses from the master timing device.

6. A clock system as recited in claim 5, wherein the master timing device comprises a rotatably mounted first permanent magnet, means to rotate the magnet a predetermined number of revolutions per minute, a second permanent magnet mounted for oscillation in close proximity to the first permanent magnet, a signal pickup coil adjacent the second permanent magnet to produce an electrical pulse with each oscillation thereof, and means to amplify and distribute each such pulse to the plurality of clocks for advancing the clocks a discrete step upon receipt of each pulse.

7. A clock system for use with a source having an alternating current signal of predetermined uniform frequency, the system comprising a master timing device responsive to, and synchronized with the frequency of the alternating current signal for producing clock pulses at timed intervals, means for supplying timing intelligence to the master timing device during periods of interruption of the alternating current signal to the master timing device, a plurality of clock units each including a stepper motor which advances its clock a predetermined discrete step in response to each clock pulse delivered to it, means for distributing clock pulses from the master timing device to the stepper motors to advance the clocks in accordance with the timing pulses from the master timing device, and auxiliary power means responsive to the interruption of the current from the alternating current source for supplying direct current power to the master timing device and thereby continuing the advance of the clocks during the interruption.

8. A clock system for use with a source having an alternating current signal of predetermined uniform frequency, the system comprising a master timing device responsive to the frequency of the alternating current signal for producing clock pulses at timed intervals, means for supplying timing intelligence to the master timing device during periods of interruption of the alternating current signal to the master timing device, a plurality of clock units each including a stepper motor which advances its clock a predetermined discrete step in response to each clock pulse delivered to it, a direct current power source and a trigger circuit responsive to the receipt of each clock pulse for momentarily connecting the direct current power source to the stepper motor, and means for distributing clock pulses from the master timing device to the stepper motors, to advance the clocks in accordance with the timing pulses from the master timing device.

9. A clock system as recited in claim 8, wherein the direct current power source in each clock comprises a battery.

10. A clock system as recited in claim 9, wherein the direct current power source comprises a rechargeable battery and means for charging the battery during the intervals between clock pulses.

11. A clock system comprising a master timing device for producing clock pulses at timed intervals, the master timing device including a vibratory unit oscillating in opposite directions from a midposition and having a predetermined natural periodic timing frequency, magnetic means mounted on the vibratory unit for producing a unidirectional magnetic field which is swept through an arc with each oscillation of the vibratory unit, a pickup coil adjacent the vibratory unit for generating an electrical signal with each sweep of the magnetic field means for amplifying the pickup coil signal and for converting it into a magnetic field which exerts a periodic force upon the magnetic means mounted on the vibratory unit to sustain the oscillations of the vibratory unit, and a plurality of clock units each including a stepper motor which advances its clock a predetermined discrete step in response to each clock pulse delivered to it, and means for distributing clock pulses from the master timing device to the stepper motors, to advance the clocks in accordance with the timing pulses from the master timing device.

12. A cock system for use with a source having an alternating current signal of predetermined uniform frequency, the system comprising a master timing device responsive to the frequency of the alternating current signal for producing clock pulses at timed intervals, the master timing device including a balance unit mounted for oscillatory motion about an axis in opposite directions from a midposition and having a predetermined natural periodic timing frequency which is a function of the frequency of the alternating current source, magnetic means mounted on the balance unit for producing a unidirectional magnetic field which is swept through an arc with each oscillation of the balance unit, a pickup coil adjacent the balance unit for generating an electrical signal with each sweep of the magnetic field, means for amplifying the pickup coil signal and for converting it into a magnetic field which exerts a periodic force upon the magnetic means mounted on the balance unit to sustain the oscillations of the balance unit, means responsive to the signal from the alternating current source for synchronizing the oscillations of the balance unit with the frequency of the alternating current source, a plurality of clock units each of which advances its cock a predetermined discrete step in response to each clock pulse delivered to it, and means for distributing clock pulses from the master timing device to the clock units, to advance the clocks in accordance with the timing pulses from the master timing device.

13. A cock system as recited in claim 12, wherein the clock pulse distributing means comprises connections between the means for amplifying the pickup coil signal and the clock units for applying amplified signals from the pickup coil directly to said clock units.

14. A clock system as recited in claim 12, wherein the means for converting the pickup coil signal includes a motor, means for controlling the speed of the motor as a function of the frequency of the pickup coil signal, and a permanently magnetized driving member rotated by the motor, the driving member being rotated about an axis adjacent the balance unit and forming a magnetic coupling with the magnetic means mounted on the balance unit, whereby the rotations of the driving member sustain the oscillations of the balance unit at its natural periodic frequency.

15. A cock system for use with a source having an alternating current signal of predetermined uniform frequency, the system comprising a master timing device responsive to the frequency of the alternating current signal for producing clock pulses at timed intervals, the master timing device including a balance unit mounted for oscillatory motion about an axis in opposite directions from a midposition and having a predetermined natural periodic timing frequency which is a submultiple of the frequency of the alternating current source, magnetic means mounted on the balance unit for producing a unidirectional magnetic field which is swept through an arc with each oscillation of the balance unit, a pickup coil adjacent the balance unit for generating an electrical signal with each sweep of the magnetic field, an amplifier responsive to the signal generated in the pickup coil, a drive coil connected to the output of the amplifier, the drive coil being positioned adjacent the balance unit such that the amplified pickup coil signal generated in the drive coil exerts a periodic magnetic force upon the magnetic means mounted on the balance unit so as to sustain the oscillations of the balance unit, means responsive to the alternating current signal for generating an electromagnetic field within the drive coil which exerts a periodic force on the magnetic means to synchronize the oscillations of the balance unit at a submultiple of the alternating current signal frequency, a plurality of clock units each including a stepper motor which advance its clock a predetermined discrete step in response to each clock pulse delivered to it, and means for distributing clock pulses from the master timing device to the stepper motors, to advance the clocks in accordance with the timing pulses from the master timing device.

16. A clock system for use with a source having alternating current signals of predetermined uniform frequency, the system comprising a permanently magnetized driving member, a motor for rotating the driving member about an axis, a permanently magnetized balance unit mounted on its central axis adjacent the driving member and forming a magnetic coupling therewith, a hair spring, one end of which is connected to the balance member and the other end of which is fixed to cause the balance member to oscillate about its central axis at a predetermined natural frequency in response to rotation of the driving member, a pickup coil adjacent the balance member for generating a first electrical signal in accordance with the oscillations of the balance member, means responsive to the frequency of the first signal for controlling the speed of the motor in accordance with the frequency, means for coupling the pickup coil through a high resistance to the source of alternating current to impress a second signal upon the first signal generated by the oscillating balance member in the pickup coil such that the rotation of the motor is synchronized with the alternating current signal, means driven by the motor for generating electrical clock pulses at timed intervals including a permanent magnet rotor, a pair of centrally orificed, cup-shaped pole pieces enclosing the rotor, each pole piece having a salient pole projecting along an axis adjacent the rotational axis of the rotor and spaced apart therefrom, a coil coaxial with the pole pieces and the rotor, and permanent magnet biasing means magnetically linked with each pole piece for generating a biasing flux which passes though the rotor, and a plurality of clock units each including a stepper motor which advances its clock a predetermined discrete step in response to each clock pulse delivered to it, and means for distributing the clock pulses to the stepper motors.

17. A cock system for use with a source having an alternating current signal of predetermined uniform frequency, the system comprising a master timing device responsive to the frequency of the alternating current signal and synchronized with it for producing clock pulses at timed intervals, means for supplying timing intelligence to the master timing device during periods of interruption of the alternating current signal to the master timing device, a radio transmitter which transmits the clock pulses at a radio frequency and a plurality of clock units each including a stepper motor, a radio receiver for receiving the radio frequency clock pulses and a trigger circuit activated by the radio receiver for advancing the stepper motor of each clock a discrete step upon receipt of a radio frequency clock pulse.

18. A clock system for use with a source having an alternating current signal of predetermined uniform frequency, the system comprising a master timing device responsive to the frequency of the alternating current signal for producing clock pulses at timed intervals, means for supplying timing intelligence to the master timing device during periods of interruption of the alternating current signal to the master timing device, a plurality of clock units each including a stepper motor having a permanent magnet rotor, a stator structure having four salient poles, a field coil coaxial with the rotor and the stator poles, and permanent magnet biasing means in magnetic circuit relationship with two selected stator poles for generating a magnetic biasing flux through the rotor in opposition to, but lesser in magnitude than, the flux generated in the stator structure upon energization of the field coil, means for indicating units of time, gearing interconnecting the rotor with the time indicating means to cause the time indicating means to advance with a predetermined number of rotations of the rotor, the ratio of the gearing being calculated such that the magnetic attraction of the rotor for the stator poles magnetically linked with the permanent magnet biasing means causes the time indicating means to detent to properly position itself in discrete time indicating units, and means for distributing clock pulses from the master timing device to the field coil of each stepper motor, to advance the clocks in accordance with the timing pulses from the master timing device.

19. A clock system as recited in claim 18, wherein at least one of the plurality of clocks is mounted in a wall, the stator structure, field coil, and permanent magnet biasing means being inset into the wall, further comprising a housing for the rotor and gears, the housing being so dimensioned that a portion of the housing and the rotor may be removably inserted into the stator structure.

20. A clock system for use with a source having an alternating current signal of predetermined uniform frequency, the system comprising a master timing device responsive to the frequency of the alternating current signal for producing timing intelligence signals, a plurality of clock units each including motor means for advancing its clock, energy storing means and trigger means responsive to each timing intelligence signal for momentarily connecting the energy storing means to the motor means, and means for distributing timing intelligence signals from the master timing device to the trigger means, to trigger the advance of said clocks in accordance with the timing intelligence from the master timing device.

21. A clock system as recited in claim 20, in which the master timing device includes means for producing a low level direct current signal, the distributing means applying the low level direct current signal to said energy storing means to supply energy thereto.

* * * * *